United States Patent
Bellomo et al.

(10) Patent No.: US 10,146,599 B2
(45) Date of Patent: Dec. 4, 2018

(54) SYSTEM AND METHOD FOR A GENERIC ACTOR SYSTEM CONTAINER APPLICATION

(71) Applicant: Synchronoss Technologies, Inc., Bridgewater, NJ (US)

(72) Inventors: Michael A. Bellomo, Coopersburg, PA (US); Casimir Saternos, Emmaus, PA (US); Mortimer L. Smedley, III, Kutztown, PA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 0 days.

(21) Appl. No.: 15/370,768

(22) Filed: Dec. 6, 2016

(65) Prior Publication Data

US 2018/0157543 A1 Jun. 7, 2018

(51) Int. Cl.
*G06F 9/48* (2006.01)
*G06F 9/54* (2006.01)
*G06F 9/445* (2018.01)
*G06F 9/455* (2018.01)
*H04L 29/08* (2006.01)

(52) U.S. Cl.
CPC .............. *G06F 9/546* (2013.01); *G06F 9/445* (2013.01); *G06F 9/45558* (2013.01); *G06F 9/48* (2013.01); *G06F 2209/482* (2013.01); *H04L 67/02* (2013.01)

(58) Field of Classification Search
CPC . G06F 9/546; G06F 9/445; G06F 9/48; G06F 2209/482; H04L 67/02
See application file for complete search history.

(56) References Cited

U.S. PATENT DOCUMENTS

| | | | | |
|---|---|---|---|---|
| 2009/0307712 A1* | 12/2009 | Young | ................... | G06F 9/546 |
| | | | | 719/313 |
| 2012/0173715 A1* | 7/2012 | Selitser | ............... | H04L 67/2809 |
| | | | | 709/224 |
| 2013/0132975 A1* | 5/2013 | Klemenz | ................ | G06Q 10/10 |
| | | | | 719/316 |
| 2013/0135314 A1* | 5/2013 | Haggerty | ............. | G06Q 10/107 |
| | | | | 345/440 |
| 2015/0052363 A1* | 2/2015 | Korangy | ................ | H04L 9/3247 |
| | | | | 713/176 |
| 2015/0134779 A1* | 5/2015 | Thompson | .............. | H04L 67/06 |
| | | | | 709/219 |

(Continued)

*Primary Examiner* — Charles E Anya
(74) *Attorney, Agent, or Firm* — Synchronoss Technologies, Inc.; Frederick W. Dour

(57) ABSTRACT

A server for providing a generic actor system container application comprising: status and control graphical user interfaces, a listener service, a cluster manager, an actor registry and discovery service, a system configurator, a plurality of handles, a plurality of listeners, and a plurality of generic actors, wherein the generic actor system container application is configured to: receive information associated with a plurality of customized domain specific actors; receive a plurality of domain specific connection information; generate the plurality of domain specific actors based on the information associated with the plurality of customized domain specific actors; register the plurality of domain specific actors; and execute and monitor a domain specific actor system using the domain specific actors based on the domain specific connection information.

18 Claims, 4 Drawing Sheets

(56) References Cited

U.S. PATENT DOCUMENTS

| | | | |
|---|---|---|---|
| 2015/0180806 A1* | 6/2015 | Honkala | H04L 51/28 709/206 |
| 2016/0085738 A1* | 3/2016 | Briggs | G06F 17/246 715/219 |
| 2016/0266897 A1* | 9/2016 | Henderson | G06F 8/24 |

* cited by examiner

SYSTEM AND METHOD FOR A GENERIC ACTOR SYSTEM CONTAINER APPLICATION

BACKGROUND OF THE INVENTION

Field of the Invention

Embodiments of the present invention generally relate to application servers and, more particularly, to a generic actor system container application.

Description of the Related Art

An actor system is a model of programming to deal with concurrent computations. The actor model can be used as a framework for modeling, understanding, and reasoning about a wide range of systems, for example, e-mail, web services, and the like. The actor model defines general rules for how a system's components should behave and interact with each other.

The representative feature of an actor system is that an actor, which is to oversee a certain function in a program, may want to split up its task into smaller, more manageable pieces (i.e., sub-tasks). For this purpose, the actor creates child actors to perform said sub-tasks, which the actor should then supervise. The actor should also handle failures of these children as appropriate. In response to a message that an actor receives, the actor may make local decisions, create more actors, send more messages, determine how to respond to the next message received, and the like.

However, when implementing an actor system, in order to prepare the system to receive messages, software developers write a significant amount of boilerplate code to implement basic parts of the system. The developers must create generic actors, define exactly what the actors are, provide a point of contact into the actor system, create a mechanism to stop the actor system, set up the system to monitor the actors, determine how many actors have been created, identify where messages are to be sent, and the like. In other words, the developer must provide the entire framework in order to make the actor system functional.

By contrast, a web server system, for example, provides a framework for web developers to operate/develop in. More specifically, a web server is a computer system that processes requests via Hypertext Transfer Protocol (HTTP) to serve files that form web pages to users in response to a user's request. A web server, upon purchase, is equipped with a web container responsible for managing the life cycle of servlets, mapping a universal resource locator (URL) to a particular servlet, and ensuring that the URL requester has the correct access rights.

The web container handles requests, creates servlet instances, loads and unloads servlets, creates and manages request and response objects, and performs other servlet-management tasks, specifying a runtime environment for web components that includes security, concurrency, life-cycle management, transaction, deployment, and other services. The purchaser of a web server does not need to think about how the web server works. All of the functionality is provided in the web container, such that the purchaser only needs to provide the web pages.

With actor systems today, programmers may use tools, such as akka spray, which is an actor based suite of libraries that provides client and server-side HTTP support on top of akka. However, akka spray is merely a set of libraries that may be used to create actor systems that are accessible using HTTP; it is not a consolidated product. Each application using actors must be created independently. Programmers need to write the software code to perform all of the functions that are currently available in a consolidated web container. It is a time-intensive endeavor to create and debug an actor system created from scratch.

Therefore, there is a need for a system and method for a consolidated generic actor system container application/framework.

SUMMARY OF THE INVENTION

A method and system for a generic actor system container application is provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other and further embodiments of the present invention are described below.

BRIEF DESCRIPTION OF THE DRAWINGS

So that the manner in which the above recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
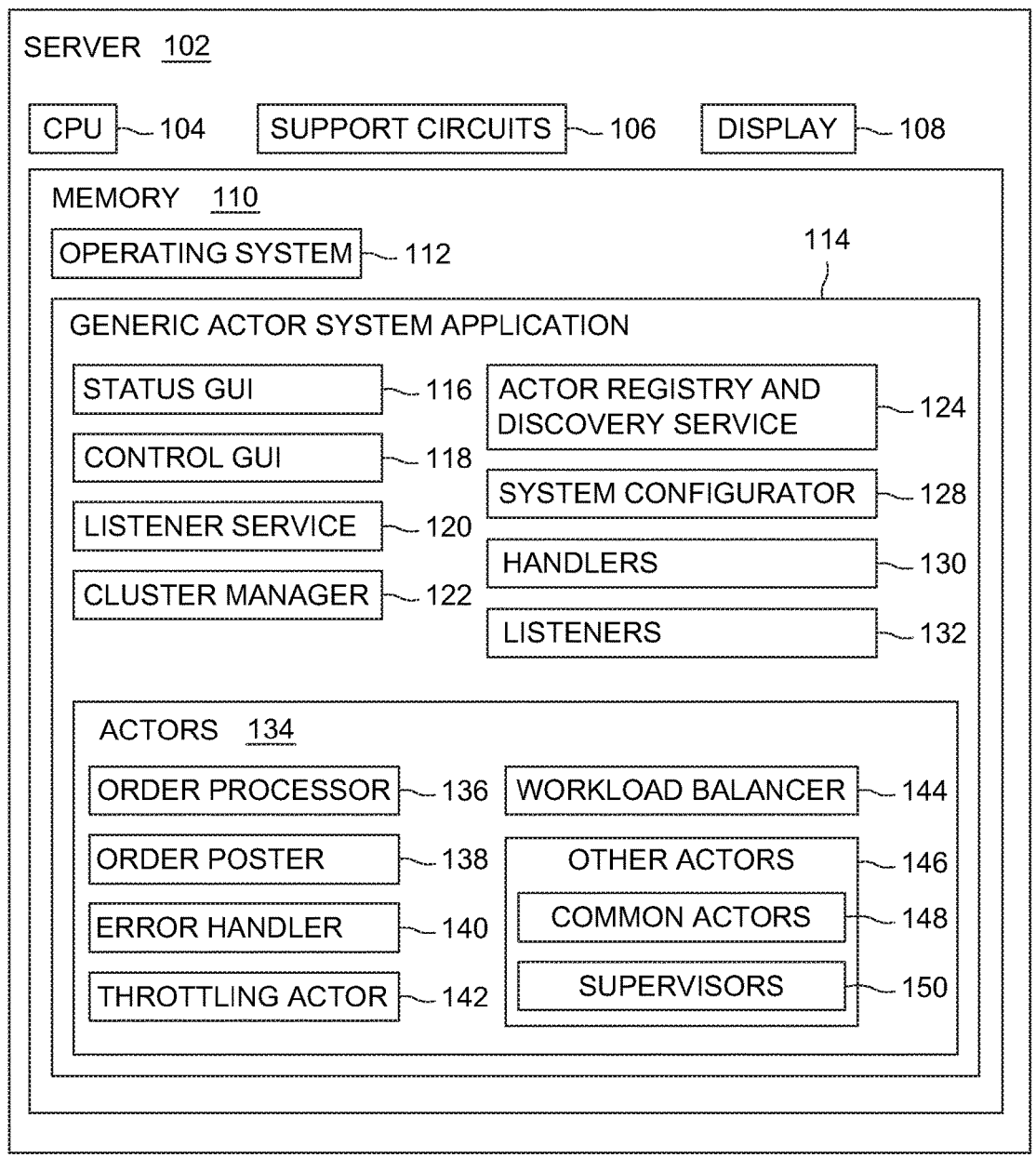
FIG. 1 is a block diagram of a system for a generic actor system container application, according to one or more embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION OF EMBODIMENTS

Embodiments of the present invention include a system and method for a generic actor system container application. The generic actor system container application is a self-contained application framework that includes actor software code, including an interface to determine the status of the actor system, an interface to control the actor system, a configuration to allow clustering of several applications, and a listener service. The generic actor system container application also includes an actor that receives messages from the listener service, an actor that sends messages to an external system for subsequent processing, an actor to provide error handling, and a configuration to coordinate characteristics of the actor system upon system startup.

In some embodiments, the self-contained application may also include one or more of the following: logging of actions in the actor system, access to the current state of the system, tools to measure throughput of the system and controls to effectively throttle message flow. The self-contained application may also include one or more of a means to visualize actor interactions, an ability to introduce new actor and message definitions from outside of the current system, an ability to dynamically modify the characteristics of the actor system without requiring a restart of the actor system, a common set of listeners to consume data, and a common set of handlers to introduce messages into the system. In addition, the self-contained application may also include one or more of a plurality of common actors that provide common services, such as an actor that prints a received message, an actor to process HTTP messages, an actor to process email messages, an actor that receives a message but defers processing of the message, and the like.

In some embodiments, the self-contained application may further include one or more of the following: a set of supervisor actors to monitor the actors in the actor system, provide registry lookup services to locate actors, provide logging services, balance workload, provide orderly termination of the system when all actors have completed their jobs, provide scheduling of messages, and the like. As such, the generic actor system container application provides a ready-made environment for creating actor systems. The framework provides comprehensive monitoring, controls, and maintenance hooks for an actor system. A user need only configure the system to the user's problem domain by writing business logic, or rules to be encapsulated in actor classes. Once configured, the system performs the regular functionality required to monitor and handle the system.

Various embodiments of systems and methods for a generic actor system container application are provided below. In the following detailed description, numerous specific details are set forth to provide a thorough understanding of the claimed subject matter. However, it will be understood by those skilled in the art that claimed subject matter may be practiced without these specific details.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular specification, the terms "actor" and "actor object" are used interchangeably.

Figure 4:
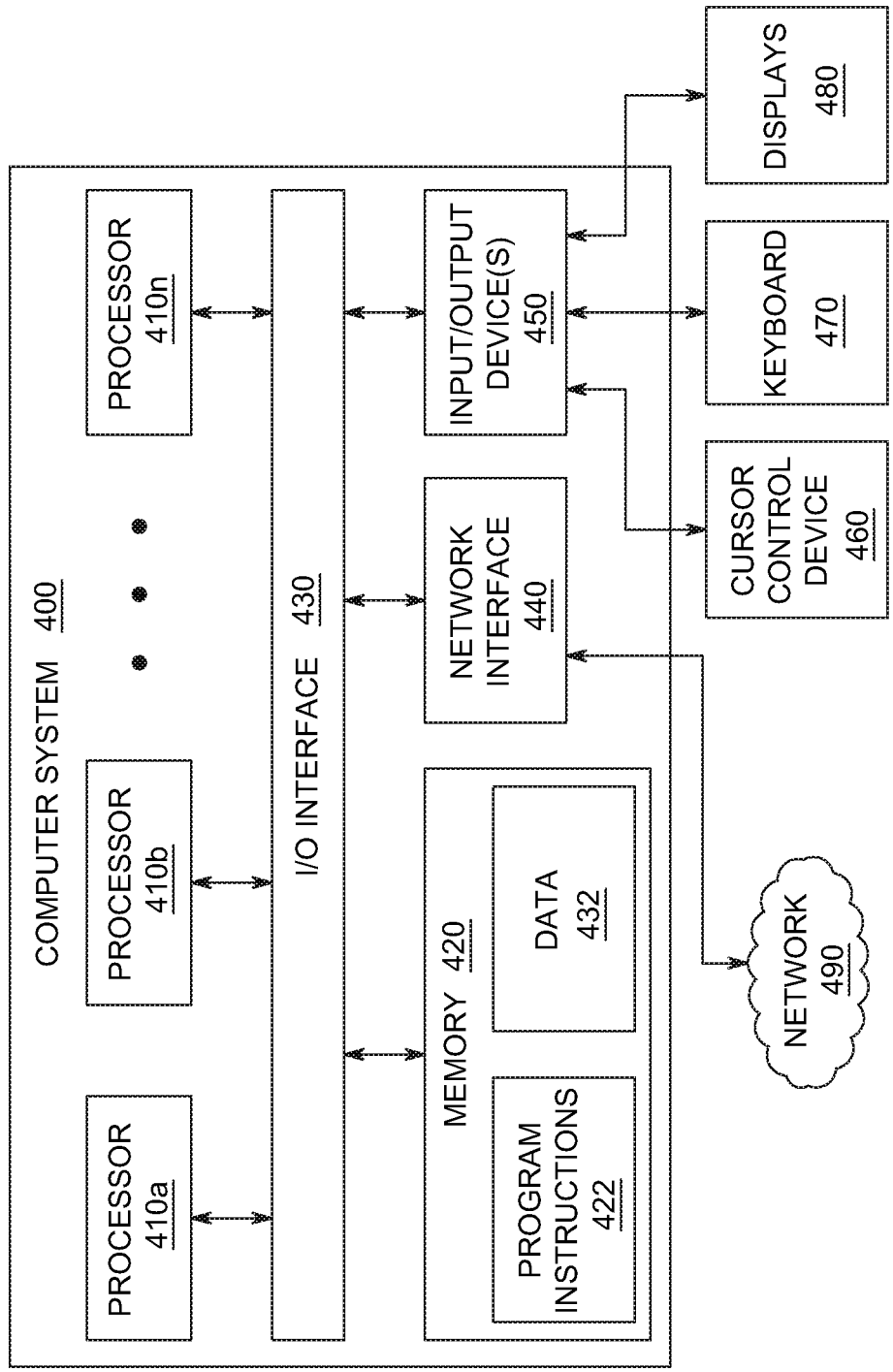
FIG. 4 is a detailed block diagram of a computer system, according to one or more embodiments.

FIG. 1 is a block diagram of a system 100 for a generic actor system container application, according to one or more embodiments. The system 100 includes a server 102. The server 102 is a computing device, for example, a desktop computer, laptop, tablet computer, and the like, or it may be a cloud based server (e.g., a blade server, virtual machine, and the like). One example of a suitable computer is shown in FIG. 4, which will be described in detail below. According to some embodiments, the server 102 includes a Central Processing Unit (CPU) 104, support circuits 106, a display 108, and a memory 110. The memory includes an operating system 112 and a generic actor system application 114. The generic actor system application 114 includes a status graphical user interface (GUI) 116, a control GUI 118, a listener service 120, a cluster manager 122, an actor registry and discovery service 124, a system configurator 128, a set of handlers 130, a set of listeners 132, and a plurality of actors 134 all comprising a set of instructions residing in memory 110 and executable by a Central Processing Unit (CPU) 104. The plurality of actors 134 includes an order processor actor 136, an order poster actor 138, an error handler actor 140, a throttling actor 142, a workload balancer 144 and a plurality of other actors 146 including but not limited to common actors 148, such as a simple output actor that prints the message that was received, an HTTP processor actor, a simple mail transfer protocol (SMTP) actor, and a defer actor that receives a message, and waits a specified amount of time before forwarding the message. The other actors 146 also includes a set of supervisor actors 150 to perform tasks such as monitoring actors, provide registry lookup services to locate actors, provide logging services, provider orderly termination of the system, provide scheduling of messages, and the like.

The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like.

The server 102 may be connected to external systems via a network (not shown), such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

The generic actor system application 114 provides a ready-made environment for creating domain specific actor systems. Domain specific actor systems include defined dependencies between domain source code for a specific implementation, such as an email processing actor system or a message processing actor system for processing messages in an online store and generic actor objects. The generic actor system application 114 may be delivered and installed on the server 102 in, for example, JAVA® Archive (JAR) package file format. The status GUI 116 provides an interface to determine the status of the actor system for example, via HTTP. For example, a query of the termination status returns a message informing a user whether all actor tasks have completed. The status GUI 116 may include an interface to provide configuration information, including but not limited to the name of the actor system, the date and time the system was started, a list of server names and/or IP addresses that are members of the cluster, cluster parameter values, a list of actor types in the system, a count of actor instances of each actor type, and the like. The control GUI 118 provides an interface for example, via HTTP to enable or disable and stop or start the actor system. The listener service 120 listens for messages over HTTP in order to receive (i.e., consume) messages from a message broker. The listener service 120 sends the received messages to the order processor actor 136.

An actor system may consist of a plurality of nodes (i.e., computers) that work together so that the plurality of nodes may be viewed as a single powerful machine. Multiple nodes may reside on a single physical device. The cluster manager 122 runs on each node of the cluster to manage and configure a set of services, or to manage and configure the complete actor system. The system configurator 128 is used to define domain specific actors and domain specific information for a specific actor system implementation.

The set of handlers 130 receive messages from external systems. Messages may be received in a range of protocols and formats. A different handler 130 processes each different protocol/format. For example, different handlers may include a representational state transfer (REST) request handler, a Simple Object Access Protocol (SOAP) request handler, an email handler, a File Transfer Protocol (FTP) file handler, and the like.

A set of listeners 132 receive messages from actors 134 in order to track the current state of each actor 134. States are dependent on the actor type. For example, an HTTP actor that is programmed to call external systems may have states such as waiting, making request, waiting for response, processing response, and the like.

Each actor 134 performs a behavior (e.g., making request, processing response) and has a state, a mailbox, children, and a supervisor. The order processor actor 136 receives messages from the listener service 120. The order poster actor 138 sends messages to external systems for subsequent processing. The error handler actor 140 handles exceptions in the actor system.

An implementation of an actor system may make HTTP requests to an external web service. Some web services have a restriction in place, for example, the actor system may not make more than ten requests in one minute or the requests are blocked. The throttling actor 142 ensures that messages are not sent out above the allowable rate.

The workload balancer 144 is an actor that distributes work (i.e., messages) among actors of the same type. For example, a workload balancer 144 may direct message traffic to a pool of order processor actors 136.

Other actors 146 include common actors 148, such as a simple output actor that prints messages that are received, an HTTP processor actor that parses HTTP messages, an simple mail transfer protocol (SMTP) actor that processes email messages, a defer actor that receives a message, waits a pre-defined amount of time, and forwards the message, and the like. Supervisor actors 150 provide supervisory services such as monitoring actors, providing registry lookup services to locate actors, provide logging service, balance the workload, provide termination of actors, scheduling of messages, and the like.

The actor registry and discovery service 124 is used to discover and resolve references to actors across a cluster. Each actor 134, when started, sends a message to the actor registry and discovery service 124 to indicate that the actor 134 is available. The actor registry and discovery service 124 includes integration with status and monitoring functions. The actor registry and discovery service 124 includes a configuration to specify data storage details, security and access details (e.g., authentication method, HTTP/HTTPS details, and the like), an ability to specify reporting and auditing capabilities, which when enabled increase performance and resource usage and provides further insights into the state of the actor system over time using message analytics and message auditing.

Actor registry and discovery service 124 operations include registering an actor, updating an actor status, facilitating the ability to lookup an actor by reference or by implementation, the ability to lookup a sending actor by message type, lookup a receiving actor by message type, an ability to run reports on actor analytics, message analytics, and/or messaging auditing. Actor analytics may include an actor implementation and actor count.

The actor registry and discovery service 124 maintains an actor registration record for each actor 134 that includes an actor reference (e.g., a unique identifier and URL) to access the actor 134, actor implementation (i.e., the source code including the JAVA class used to implement the actor logic), message implementation (i.e., a list of code units in JAVA used to the implement message logic), actor creation time, actor destruction time, and actor status.

Message analytics may enable the running of a report that includes an originating actor implementation, a destination actor implementation, a message implementation, and a message count. Message auditing may enable the running of a report that includes an originating actor implementation, an originating actor reference, a destination actor implementation, a destination actor reference, a message implementation, and a message reference.

Supervisor actors 150 interact with the actor registry and discovery service 124 asking for dependent service actors. Publisher actors interact with the actor registry and discovery service 124 informing the registry of their availability. When publisher actors register their availability, supervisor actors 150 receive their endpoint references, which in turn publish their availability as their dependencies are supplied. In this way, actor availability cascades across the cluster.

In order to create a new domain specific implementation using the generic actor system application 114, a developer merely needs to use a template, for example using an AsyncProcessor Maven archetype, to generate a sample AsyncProcessor implementation. The developer then customizes their domain specific implementation by extending an actorSystem class, which is a customized version of a standard actor library. The domain specific implementation creates, for example, a Java class, that extends the customized actorSystem class. This created Java class includes the ability to schedule actor calls (i.e., accessing a given actor and sending said actor a message at a specified time). This created Java class also includes convenience methods for creating actors and accessing system properties.

The developer adds system level utility methods that initiate work in the actor system. Domain specific actor classes are created by extending appropriate actor interfaces and implementing code within the actor that instructs the actor what to do or what other actors to call. A base handler class is also extended to create logic to call actors based on, for example HTTP API requests. Using only these steps, a developer is able to build and run a domain specific actor system that is fully operational due to the generic actor system application 114. In addition, once the system is running, additional domain specific actors may be created again by extending an appropriate actor interface, implementing code within the actors to instruct each actor what to do or what other actors to call, and extending the base handler class to receive requests. The additional domain specific actors may then be dynamically loaded and added to the running actor system.

The AsyncProcessor includes features that include reading the configuration of the domain specific system on startup, sends messages to consumer actors to associate the consumer actors with queues from which the actors will pull messages, runs a web server that allows an administrator to modify the status of the system via, for example HTTP API calls (e.g., start, stop, enable, disable, status), and schedules consumers actors to initiate connections to the queues to consume messages. The base handler class may be implemented to create code that runs in response to an API request.

For example, a domain specific actor system may include OrderConsumer, OrderPoster, and ErrorHandler actors. The AsyncProcessor includes an example implementation that may be modified as needed for alternate implementations. When the system is started, a set of OrderConsumer actors are created. The OrderConsumer actors read messages from an external queue. The messages hold order data. The OrderConsumer actor pulls messages from the queue, creates messages to send to an OrderPoster actor, and sends the message to an OrderPoster actor.

The OrderPoster actor receives the messages, configures an HTTP request, and posts messages to an externally configured business process modeling (BPM) system via HTTP. If an exception occurs, the ErrorHandler actor takes an action that is specified in its source code. By default, the ErrorHandler actor logs an error message associated with the exception to a central logging server. If the central logging server is unavailable, the ErrorHandler periodically retries logging the message.

Messages specific to the example domain specific actor system that are passed between actors include OrderMessages that are created by the OrderConsumer and sent to the OrderPoster, ErrorMessages that are sent to the ErrorHandler by various actors when an exception occurs, OrderProcessorMessages, such as consume, close, enable, disable, and status that are sent to the OrderConsumer when the embedded HTTP server receives a corresponding message, and QueueConfigurationMessages, that are sent to an OrderConsumer to indicate a location of the queue to consume.

The generic actor system application 114 provides common functionality used in an actor system, thereby alleviating a developer from writing source code for creating and defining actors, starting and stopping the actor system, setting up services to monitor the actor system, and the like. With the generic actor system application 114, a developer need only specify the parts of the problem domain without worrying about basic actor system functionality, as described in further detail through exemplary embodiments in FIGS. 2 and 3, below.

Figure 2:
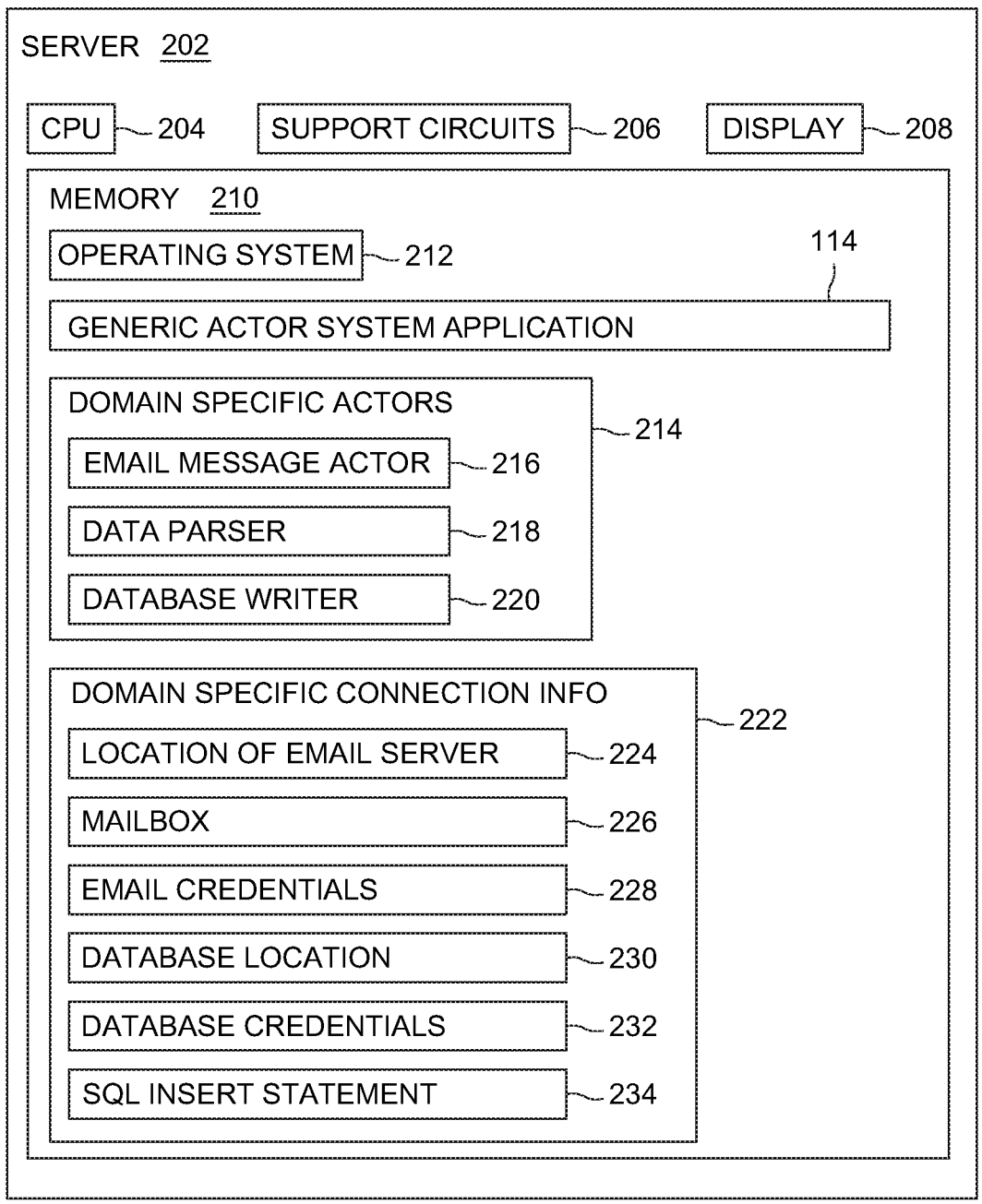
FIG. 2 depicts a block diagram of an exemplary email processing system using the generic actor system application, according to one or more embodiments of the invention.

FIG. 2 depicts a block diagram of an exemplary email processing system 200 using the generic actor system application 114, according to one or more embodiments of the invention. The email processing system 200 is a simplified example of a system that watches for messages to appear in an email mailbox, extracts address data in the message, and writes the data to a relational database.

The email processing system 200 includes a server 202. The server 202 is a computing device, for example, a desktop computer, laptop, tablet computer, and the like, or it may be a cloud based server e.g., a blade server, virtual machine, and the like. One example of a suitable computer is shown in FIG. 4, which will be described in detail below. According to some embodiments, the server 202 includes a Central Processing Unit (CPU) 204, support circuits 206, a display 208, and a memory 210. The memory includes an operating system 212 and a generic actor system application 114, domain specific actors 214, and domain specific connection information 222.

In the present exemplary email processing system 200, the domain specific actors 214 include an email message actor 216, a data parser 218, and a database writer 220. The domain specific connection information 222 includes a location of an email server 224, a mailbox 226, email credentials 228, a database location 230, database credentials 232, and a structured query language (SQL) insert statement 234. The domain specific actors 214 each comprise a set of instructions residing in memory 210 and executable by a Central Processing Unit (CPU) 204. The domain specific connection information 222 may be provided in a text file. For example, a Java JAR file may hold compiled actor classes and property files that include the connection information (i.e., configuration data).

The CPU 204 may include one or more commercially available microprocessors or microcontrollers that facilitate data processing and storage. The various support circuits 206 facilitate the operation of the CPU 204 and include one or more clock circuits, power supplies, cache, input/output circuits, and the like. The memory 210 includes at least one of Read Only Memory (ROM), Random Access Memory (RAM), disk drive storage, optical storage, removable storage and/or the like.

The email message actor 216 listens for messages to appear in the mailbox 226. The email credentials 228 are used to access the mailbox 226. The email message actor 216 reads any message that arrives in the mailbox 226. The data parser 218 extracts any street address data found in the message. The database writer 220 accesses the database at database location 230, logs in using database credentials 232, and writes the data to the relational database using the SQL insert statement 234.

Figure 3:
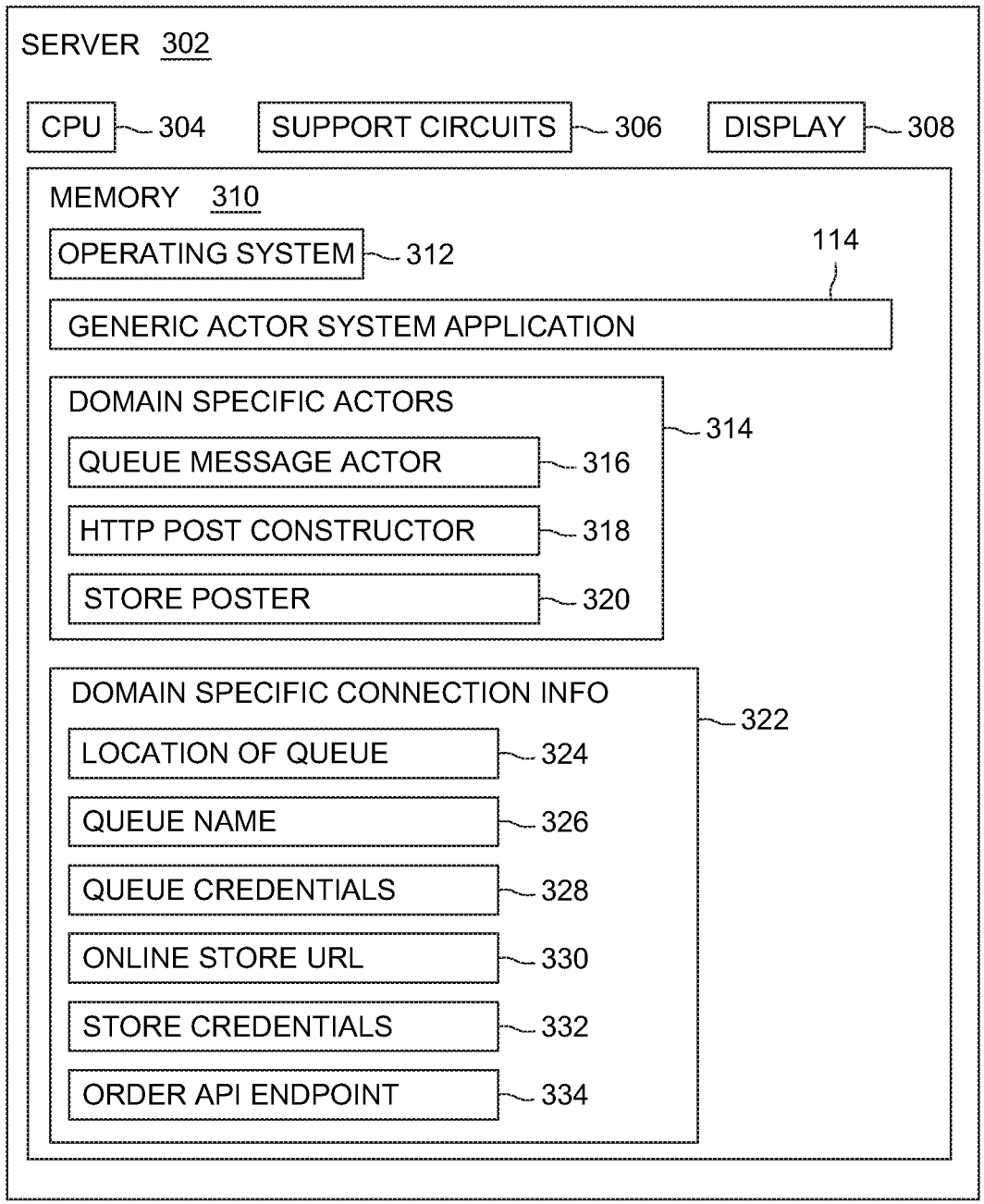
FIG. 3 depicts a block diagram of an exemplary order processing system using the generic actor system application, according to one or more embodiments of the invention.

FIG. 3 depicts a block diagram of an order processing system 300 using the generic actor system application 114, according to one or more embodiments of the invention. The order processing system 300 is a simplified example of a system that reads messages from a queue and posts orders to an online store.

The order processing system 300 includes a server 302. The server 302 is a computing device, for example, a desktop computer, laptop, tablet computer, and the like, or it may be a cloud based server e.g., a blade server, virtual machine, and the like. One example of a suitable computer is shown in FIG. 4, which will be described in detail below.

According to some embodiments, the server 302 includes a Central Processing Unit (CPU) 304, support circuits 306, a display 308, and a memory 310. The memory includes an operating system 312 and a generic actor system application 114, domain specific actors 314, and domain specific connection information 322.

In the present exemplary order processing system 300, the domain specific actors 314 include a queue message actor 316, an HTTP post constructor 318, and a store poster 320. The domain specific connection information 322 includes a location of the queue 324, a queue name 326, queue credentials 328, an online store universal resource locator (URL) 330, store credentials 332, and an order application programming interface (API) endpoint 334. The domain specific actors 314 each comprise a set of instructions residing in memory 310 and executable by a Central Processing Unit (CPU) 304. The domain specific connection information 322 may be provided in a text file. For example, a Java JAR file may hold compiled actor classes and property files that include the connection information (i.e., configuration data).

The CPU 304 may include one or more commercially available microprocessors or microcontrollers that facilitate data processing and storage. The various support circuits 306 facilitate the operation of the CPU 304 and include one or more clock circuits, power supplies, cache, input/output circuits, and the like. The memory 310 includes at least one of Read Only Memory (ROM), Random Access Memory (RAM), disk drive storage, optical storage, removable storage and/or the like.

The queue message actor 316 reads messages from a queue located at queue location 324, with queue name 326, using queue credentials 328. The HTTP post constructor 318 parses the message from the queue and generates an HTTP request for an online order. The store poster 320 accesses the online store at online store URL 330 using stored credentials 332 and places the order at the online store URL 330 using the order API endpoint 334

In both FIG. 2 and FIG. 3, the problem domain and underlying software systems are completely different; yet the generic actor system application 114 provides all of the standard functionality needed to maintain and support each actor system, regardless of the business problem being solved.

FIG. 4 depicts a computer system 400 that can be utilized in various embodiments of the present invention to implement the computer and/or the display, according to one or more embodiments.

Various embodiments of method and apparatus for a generic actor system application, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the domain specific actor systems 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the operations described with respect to FIG. 2 and FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined.

The invention claimed is:

1. A server providing a generic actor system container application comprising:
    at least one processor;
    at least one input device; and
    at least one storage device storing:
        status and control graphical user interfaces, a listener service, a cluster manager, an actor registry and discovery service, a system configurator, a plurality of handles, a plurality of listeners, and a plurality of generic actors including supervisor actors and publisher actors, wherein the at least one storage device stores processor executable instructions for a generic actor system container application which, when executed by the at least one processor, perform a method to:
            receive information associated with a plurality of customized domain specific actors;
            receive a plurality of domain specific connection information; generate a plurality of domain specific actors based on the information associated with the plurality of customized domain specific actors;
register the plurality of domain specific actors; and
execute and monitor a domain specific actor system using the domain specific actors based on the domain specific connection information, wherein the actor registry and discovery service maintains an actor registration record for each actor, wherein each actor registration record comprises a unique actor identifier, an actor class and implementation, a list of code units to implement message logic, an actor creation time, an actor destruction time, and an actor status, wherein the actor registry and discovery service is configured to register an actor, update an actor status, facilitate the ability to lookup an actor by reference or by implementation, facilitate the ability to lookup an actor by message type, facilitate an ability to run reports on actor analytics, message analytics, and message auditing, and wherein message analytics comprise an actor implementation for an originating actor, an actor implementation for a destination actor, a message implementation, and a message count, and wherein message auditing comprises tracking an implementation of an actor originating a message, a reference to the actor originating the message, an implementation of an actor receiving a message, a reference to the actor receiving the message, a message implementation, and a message reference, wherein the supervisor actors interact with the actor registry and discovery service asking for dependent service actors, wherein the publisher actors interact with the actor registry and discovery service informing the registry of their availability, and wherein when publisher actors register their availability, the supervisor actors receive the publisher actors endpoint references, which in turn publish their availability as their dependencies are supplied.

2. The server of claim 1, wherein the generic actor system container application processor-executable instructions further:
receive information associated with at least one additional domain specific actor while the domain specific actor system is executing and being monitored;
generate the at least one additional domain specific actor;
register the at least one additional domain specific actor; and
execute and monitor the domain specific actor system that includes the at least one additional domain specific actor.

3. The server of claim 1, wherein the status graphical user interface receives system configuration information comprising at least a name of the domain specific actor system, a date and time the system was started, a list of server names and/or internet protocol (IP) addresses associated with a plurality of servers that are members of a cluster, cluster parameter values, and a list of actor types in the system.

4. The server of claim 3, wherein executing the domain specific actor system comprises:
reading the configuration information of the domain specific actor system;
transmitting messages to a plurality of consumer actors to identify a location from where the plurality of consumer actors pull messages into the system;
starting the system; and
scheduling consumer actors to initiate connections from where the consumer actors pull messages.

5. The server of claim 1, wherein information associated with each specific actor of the plurality of customized domain specific actor comprises at least an actor class, software code associated with tasks to be performed by the actor and calls to make to other actors, and logic to call actors based on application programming interface (API) requests.

6. The server of claim 1, wherein the control graphical user interface modifies the status of the domain specific actor system.

7. The server of claim 6, wherein modifying the status of the domain specific actor system comprises enabling, disabling, starting, and stopping the domain specific actor system via Hypertext Transfer Protocol (HTTP) API calls.

8. The server of claim 1, wherein messages are transmitted between actors via HTTP.

9. The method of claim 1, wherein actor analytics comprise an actor implementation and an actor count.

10. The method of claim 1, wherein message analytics comprise an actor implementation for an originating actor, an actor implementation for a destination actor, a message implementation, and a message count.

11. The server of claim 1, wherein connection information comprises at least a location identifying from where messages are received into the domain specific system, security credentials to access the location from where messages are received, a location identifying where messages are to be sent, security credentials to access the location where messages are to be sent, and a description of a format for messages that are to be sent.

12. A non-transitory computer readable medium for storing computer instructions that, when executed by at least one processor causes the at least one processor to perform a method for providing a generic actor system container application comprising:
accessing status and control graphical user interfaces, a listener service, a cluster manager, an actor registry and discovery service, a system configurator, a plurality of handles, a plurality of listeners, and a plurality of generic actors including supervisor actors and publisher actors, wherein the generic actor system container application is configured to perform the method of:
receiving information associated with a plurality of customized domain specific actors; receiving a plurality of domain specific connection information;
generating the plurality of domain specific actors based on the information associated with the plurality of customized domain specific actors;
registering the plurality of domain specific actors; and
executing and monitoring a domain specific actor system using the domain specific actors based on the domain specific connection information, wherein the actor registry and discovery service is configured to register an actor, update an actor status, facilitate the ability to lookup an actor by reference or by implementation, facilitate the ability to lookup an actor by message type, facilitate an ability to run reports on actor analytics, message analytics, and message auditing, wherein message auditing comprises tracking an implementation of an actor originating a message, a reference to the actor originating the message, implementation of an actor receiving a message, a reference to the actor receiving the message, a message implementation, and a message reference, wherein the supervisor actors interact with the actor registry and discovery service asking for dependent service actors, wherein the publisher actors interact with the actor registry and discovery service informing the registry of their availability, and wherein when publisher actors register their availability, the supervisor actors receive the publisher actors endpoint references, which in turn publish their availability as their dependencies are supplied.

13. The non-transitory computer readable medium of claim 12, wherein the method performed by the generic actor system container application further comprises:

receiving information associated with at least one additional domain specific actor while the domain specific actor system is executing and being monitored;

generating the at least one additional domain specific actor;

registering the at least one additional domain specific actor; and executing and monitoring the domain specific actor system that includes the at least one additional domain specific actor.

14. The non-transitory computer readable medium of claim 12, wherein the status graphical user interface is configured to receive system configuration information comprising at least a name of the domain specific actor system, a date and time the system was started, a list of server names and/or internet protocol (IP) addresses associated with a plurality of servers that are members of a cluster, cluster parameter values, and a list of actor types in the system.

15. The non-transitory computer readable medium of claim 14, wherein executing the domain specific actor system comprises:

reading the configuration information of the domain specific actor system;

transmitting messages to a plurality of consumer actors to identify from where the plurality of consumer actors pull messages into the system;

starting the system; and scheduling consumer actors to initiate connections from where the consumer actors pull messages.

16. The non-transitory computer readable medium of claim 12, wherein information associated with each specific actor of the plurality of customized domain specific actor comprises at least an actor class, software code associated with tasks to be performed by the actor and calls to make to other actors, and logic to call actors based on application programming interface (API) requests.

17. The non-transitory computer readable medium of claim 12, wherein the control graphical user interface is configured to modify the status of the domain specific actor system, wherein modifying the status of the domain specific actor system comprises enabling, disabling, starting, and stopping the domain specific actor system via Hypertext Transfer Protocol (HTTP) API calls.

18. The non-transitory computer readable medium of claim 12, wherein the actor registry and discovery service maintains an actor registration record for each actor, wherein each actor registration record comprises a unique actor identifier, an actor class and implementation, a list of code units to implement message logic, an actor creation time, an actor destruction time, and an actor status, and wherein actor analytics comprise actor implementation and an actor count, and wherein message analytics comprise actor implementation for an originating actor, actor implementation for a destination actor, message implementation, and a message count.

* * * * *